US011182294B2

(12) United States Patent
Parker et al.

(10) Patent No.: US 11,182,294 B2
(45) Date of Patent: Nov. 23, 2021

(54) APPARATUS AND METHOD FOR PROVIDING AN ATOMIC SET OF DATA ACCESSES

(71) Applicant: ARM LIMITED, Cambridge (GB)

(72) Inventors: Jason Parker, Sheffield (GB); Graeme Peter Barnes, Cambridge (GB)

(73) Assignee: ARM Limited, Cambridge (GB)

( * ) Notice: Subject to any disclaimer, the term of this patent is extended or adjusted under 35 U.S.C. 154(b) by 61 days.

(21) Appl. No.: 16/334,095

(22) PCT Filed: Aug. 18, 2017

(86) PCT No.: PCT/GB2017/052447
§ 371 (c)(1),
(2) Date: Mar. 18, 2019

(87) PCT Pub. No.: WO2018/060671
PCT Pub. Date: Apr. 5, 2018

(65) Prior Publication Data
US 2019/0258574 A1    Aug. 22, 2019

(30) Foreign Application Priority Data

Sep. 28, 2016 (GB) ...................................... 1616452

(51) Int. Cl.
*G06F 12/10* (2016.01)
*G06F 12/0815* (2016.01)
*G06F 12/14* (2006.01)

(52) U.S. Cl.
CPC .......... *G06F 12/0815* (2013.01); *G06F 12/10* (2013.01); *G06F 12/145* (2013.01);
(Continued)

(58) Field of Classification Search
CPC .... G06F 12/0815; G06F 12/08; G06F 12/145; G06G 12/145
(Continued)

(56) References Cited

U.S. PATENT DOCUMENTS 6,332,185 B1 * 12/2001 Kaufman ................ G06F 12/10
711/156
8,473,681 B2 * 6/2013 Lin ........................ G06F 9/3834
711/121
(Continued)

FOREIGN PATENT DOCUMENTS

CN         103140829        6/2013
CN         104516831        4/2015
(Continued)

OTHER PUBLICATIONS

S. Franey and M. Lipasti, "Accelerating atomic operations on GPGPUs," 2013 Seventh IEEE/ACM International Symposium on Networks-on-Chip (NoCS), 2013, pp. 1-8, doi: 10.1109/NoCS.2013.6558404.*
(Continued)

*Primary Examiner* — Pierre Miche Bataille
(74) *Attorney, Agent, or Firm* — Nixon & Vanderhye P.C.

(57) ABSTRACT

A data processing apparatus 2 includes a cache memory 8 for storing data items to be accessed. Coherency control circuitry 20 controls coherency between data items stored within the cache memory and one or more other copies of the data items stored outside the cache memory. A data access buffer 6 buffers a plurality of data access to respective data items stored within the cache memory. Access control circuitry 20 is responsive to coherency statuses managed by the coherency control circuitry for the plurality of data items to be subject to data access operations to be performed together atomically as an atomic set of data accesses to ensure that the coherency statuses for all of these data items
(Continued)

permit all of the atomic set of data accesses to be performed within the cache memory before the set of atomic data accesses are commenced.

19 Claims, 4 Drawing Sheets

(52) U.S. Cl.
CPC .. *G06F 12/1441* (2013.01); *G06F 2212/1024* (2013.01); *G06F 2212/1032* (2013.01); *G06F 2212/1052* (2013.01); *G06F 2212/657* (2013.01)

(58) Field of Classification Search
USPC .......................................................... 711/145
See application file for complete search history.

(56) References Cited

U.S. PATENT DOCUMENTS

| | | | |
|---|---|---|---|
| 9,141,547 | B2 | 9/2015 | Shen |
| 9,710,280 | B2 * | 7/2017 | Chung ................. G06F 9/3004 |
| 10,409,612 | B2 * | 9/2019 | Dixon .................. G06F 9/3004 |
| 2010/0275209 | A1 | 10/2010 | Detlefs |
| 2010/0332766 | A1 * | 12/2010 | Zeffer ................ G06F 12/0815 711/144 |
| 2010/0333096 | A1 | 12/2010 | Dice et al. |
| 2013/0275715 | A1 * | 10/2013 | Caprioli ................. G06F 9/528 711/203 |
| 2014/0337585 | A1 | 11/2014 | Grisenthwaite et al. |
| 2015/0193265 | A1 | 7/2015 | Riegel |

FOREIGN PATENT DOCUMENTS

| | | |
|---|---|---|
| JP | 2003-524248 | 8/2003 |
| JP | 4301520 | 7/2009 |
| JP | 2013-546088 | 12/2013 |
| TW | 1483180 | 5/2015 |
| WO | 2014/021879 | 2/2014 |
| WO | 2015/061731 | 4/2015 |
| WO | 2015/112148 | 7/2015 |

OTHER PUBLICATIONS

D. Vantrease, M. H. Lipasti and N. Binkert, "Atomic Coherence: Leveraging nanophotonics to build race-free cache coherence protocols," 2011 IEEE 17th International Symposium on High Performance Computer Architecture, 2011, pp. 132-143, doi: 10.1109/HPCA.2011.5749723.*
Combined Search and Examination Report for GB 1616452.7 dated Mar. 24, 2017, 7 pages.
International Search Report and Written Opinion of the ISA for PCT/GB2017/052447 dated Nov. 30, 2017, 15 pages.
Office Action for IL Application No. 264671 dated Oct. 8, 2020 and English translation, 4 pages.
Office Action for EP Application No. 17757848.1 dated May 28, 2021, 8 pages.
Office Action for TW Application No. 106130093 dated Jul. 5, 2021 and English translation, 23 pages.
Office Action for JP Application No. 2019-515643 dated Oct. 1, 2021, 5 pages.

* cited by examiner

APPARATUS AND METHOD FOR PROVIDING AN ATOMIC SET OF DATA ACCESSES

This application is the U.S. national phase of International Application No. PCT/GB2017/052447 filed Aug. 18, 2017 which designated the U.S. and claims priority to GB 1616452.7 filed Sep. 28, 2016, the entire contents of each of which are hereby incorporated by reference.

This disclosure relates to the field of data processing systems. More particularly, this disclosure relates to data processing systems supporting data access operations to be performed atomically.

Atomic operation within the field of data processing systems indicates that a group of operations or actions are controlled to be performed such that, at least from the point of view of the programmer or an external observer, the actions are performed together and either all succeed or all fail. Such atomicity is a useful behavior to support and it can, for example, ensure that multiple items of state or data are kept in synchronism in a manner which may be useful for ensuring correct operation, or a high level of security. However, providing atomic behavior typically imposes performance penalties and an increase in complexity within the system. For example, the use of database locks to ensure that updates to multiple instances of data are performed together may significantly slow the processing.

Viewed from one aspect the present disclosure provides apparatus for processing data comprising:

processing circuitry to perform data processing operations, said data processing operations including data access operations;

a cache memory to store data items to be accessed by said data access operations;

coherency control circuitry to control coherency between said data items stored within said cache memory and one or more other copies of said data items stored outside said cache memory;

a data access buffer to buffer a plurality of data accesses to respective data items stored within said cache memory; and access control circuitry responsive to coherency statuses managed by said coherency control circuitry in respect of a plurality of data items subject to respective data access operations to be performed together atomically as an atomic set of data accesses to ensure said coherency statuses for said plurality of data items permit all of said atomic set of data accesses to be performed within said cache memory before said atomic set of data accesses are commenced and performed together atomically.

Viewed from another aspect the present disclosure provides a method of processing data comprising the steps of:

performing data processing operations, said data processing operations including data access operations;

storing within a cache memory data items to be accessed by said data access operations;

controlling coherency between said data items stored within said cache memory and one or more other copies of said data items stored outside said cache memory;

buffering a plurality of data accesses to respective data items stored within said cache memory; and in response to coherency statuses of a plurality of data items subject to respective data access operations to be performed together atomically as an atomic set of data accesses, ensuring said coherency statuses for said plurality of data items permit all of said atomic set of data accesses to be performed within said cache memory before said atomic set of data accesses are commenced and performed together atomically.

Viewed from another aspect the present disclosure provides apparatus for processing data comprising:

processing circuitry to perform data processing operations, said data processing operations including data access operations specified using virtual memory addresses within a corresponding virtual memory address space;

address translation circuitry to translate said virtual addresses to physical addresses within a physical address space to address memory circuitry; and access control circuitry responsive to virtual memory addresses of data accesses to a plurality of data items to control said data accesses to said plurality of data items to be performed as an atomic set of data accesses.

Viewed from another aspect the present disclosure provides a method of processing data comprising the steps of:

performing data processing operations, said data processing operations including data access operations specified using virtual memory addresses within a corresponding virtual memory address space;

translating said virtual addresses to physical addresses within a physical address space to address memory circuitry; and in response to virtual memory addresses of data accesses to a plurality of data items, controlling said data accesses to said plurality of data items to be performed as an atomic set of data accesses.

Example embodiments will now be described, by way of example only, with reference to the accompanying drawings in which:

FIG. 1 schematically illustrates a portion of a multiple core/cache data processing system incorporating mechanisms for ensuring that a plurality of data accesses are performed as an atomic set of data accesses;

Figure 1:
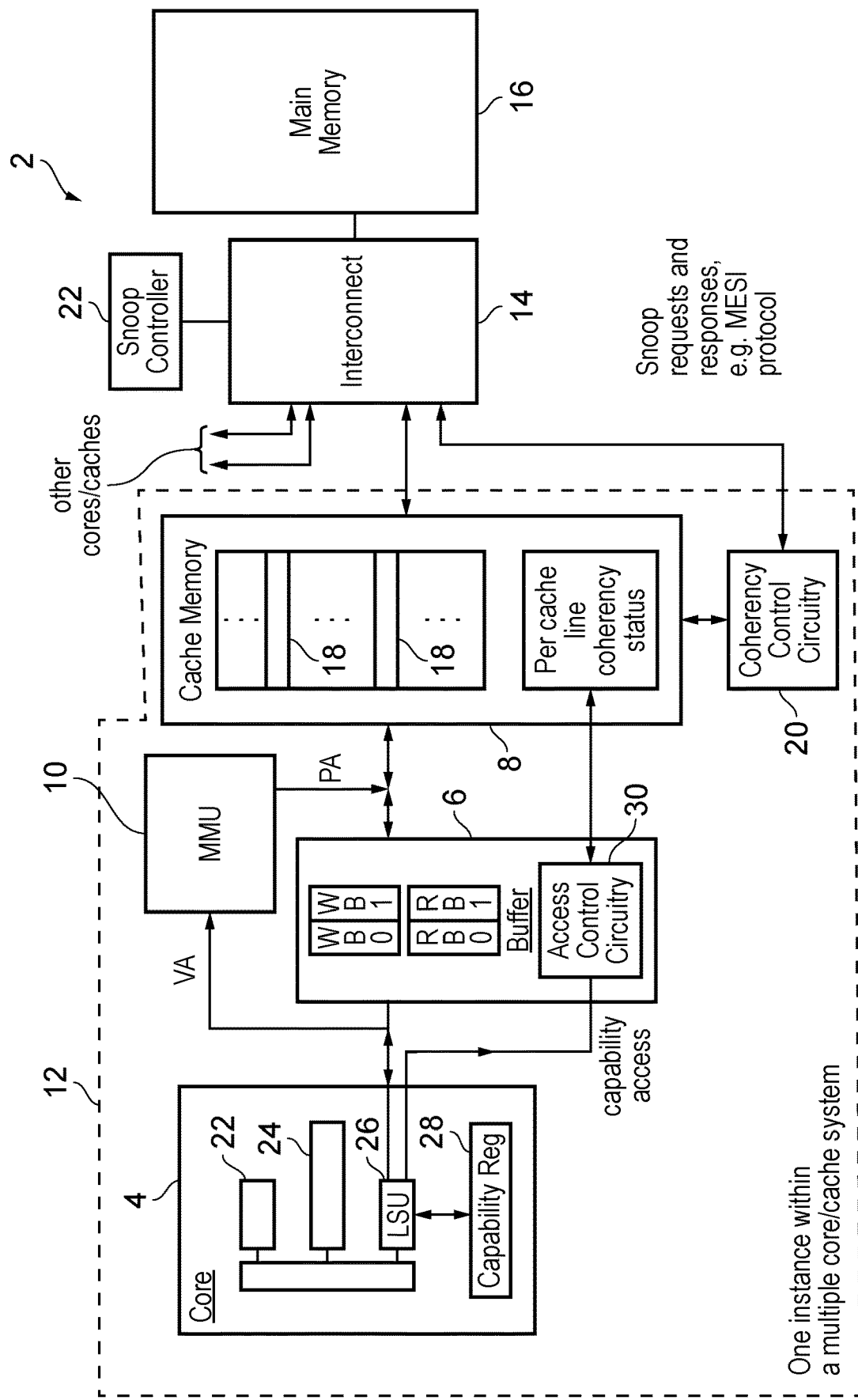

FIG. 1 schematically illustrates a data processing system 2 including a processor core 4 coupled by buffer circuitry 6 to a cache memory 8. A memory management unit 10 is responsible for translating virtual addresses (VA) generated by the processor core 4 into physical addresses (PA) as used by the cache memory 8 and a main memory 16. The processor core 4 and the cache memory 8 are one instance of such core and cache combination which are present within the data processing system 2. More particularly, other instances of the circuitry surrounded by the dashed line 12 are present within the data processing system 2 and connect to interconnect circuitry 14. The interconnect circuitry 14 is connected to the main memory 16 which is shared between the different instances of the processor core 4 and the cache memory 8.

In order to manage coherence between different copies of a data value corresponding to a given memory address within the physical memory address space, the data processing system 2 is provided with coherency mechanisms which operate by transferring snoop requests and snoop responses via the interconnect circuitry 14 in accordance with a protocol such as the MESI protocol. In accordance with such techniques, the coherency status of individual cache lines 18 stored within the cache memory 8 are allocated to the one of modified, exclusive, shared or invalid states. The per cache line coherency status of each of the cache lines 18 is stored within the cache memory 8. Coherency control circuitry 20 associated with the cache memory 8 serves to manage data access operations to the cache lines 18 in dependence upon the coherency status of those cache lines at the cache memory 8 concerned. For example, if a cache line 18 is held in a shared state within the cache memory 8 and the processor core 4 wishes to write to that cache line, then the coherency control circuitry 20 will issue a snoop request via the interconnect circuitry 14, and using a snoop controller 22 coupled to the interconnect circuitry 14, to obtain exclusive access to that cache line 18 before permitting the write to be performed. When exclusive access is obtained, this may result in copies of the data value corresponding to the memory address concerned held elsewhere within the data processing system to be marked as invalid.

In a similar way, when a cache line 18 is written to by an associated processor core 4, then its status may be marked as modified indicating that any other copy of that data value held elsewhere will be out-of-date, and additionally the requirement to write back the modified data value to the main memory 16 when it is evicted from the cache memory 8.

It will be appreciated that the above described coherency status values and coherency management techniques are only one example of a variety of different such coherency status values, coherency protocols and coherency management techniques which are possible and with which those in this technical field will be familiar.

The processor core 4 includes a plurality of processing pipelines 22, 24, 26 including a load store pipeline 26 for performing data access operations. Some of these data access operations may be associated with loads to or stores from one or more capability registers 28. These capability registers store capability values which can be used to indicate and control permitted processing capabilities of a corresponding process executed by the processor core 4. For example, capability values may be used to control which ranges of memory addresses a particular process may access during its execution. In order to protect the integrity and security of the capability values, they have associated TAG values which indicate whether a particular data value being subject to a data access is or is not to be treated as a valid capability value. More particularly, the virtual address associated with a data access may be used to derive a corresponding address of a TAG value with that TAG value either indicating that the corresponding virtual address is storing a valid capability value or is not storing a valid capability value. The capability values and the TAG values within such a system have a close relationship and should be accessed atomically in order to ensure the integrity of the processing and a sufficient degree of security. For example, when a capability value is read and a TAG value is read, then the capability value and the TAG value should be sampled at the same point in time (at least from the programmers point of view) in order to avoid the possibility of, for example, a validity value being changed between the point in time at which the capability value was read and a subsequent point in time at which the corresponding TAG value was read.

The capability value and the TAG value discussed above are one example of the situation in which a plurality of data items are to be accessed as an atomic set of data accesses. A more general example would be to consider accessing a payload value and a corresponding validity value. The validity value indicating an aspect of the validity status of the corresponding payload value. It will be appreciated that there are many other types of system and usage in which multiple data items associated with each other should be accessed via an atomic set of data accesses.

The buffer circuitry 6 supports the performing together of multiple reads or multiple writes. These reads and writes may not take place at exactly the same time, but given the hardware support provided by the buffer circuitry 6, they can appear from the programmer's point of view to be performed at the same time.

The buffer circuitry 6 includes access control circuitry 30. The access control circuitry 30 is responsive to a signal from the processor core 4 indicating when a data access is being performed whether or not that data access is to a capability value. The access control circuitry 30 also is able to read the coherency status values of the different cache lines 18 stored within the cache memory 8. Accordingly, when the access control circuitry 30 detects that an access to be performed as a capability access, then it generates the address of the corresponding TAG value. The capability access generated by the processor core 4 uses a virtual address within a virtual memory space. The TAG value also uses a TAG address within this virtual memory space. The relationship between the virtual address of the capability value and the virtual address of the corresponding TAG value is predetermined and will be described further below in relation to FIG. 2. The memory management unit 20 remaps virtual addresses (VA) to physical addresses (PA) as the cache memory 8 and the main memory 16 operate using physical addresses (PA). The memory management unit 10 may also be responsible for other control functions, such as permission control.

When the access control circuitry 30 has both the address of the coherency value to be accessed and the address of the corresponding TAG value (now translated to physical addresses), the coherency status of corresponding cache lines 18 within the cache memory storing those values may be determined. If the cache memory 18 does not currently store the coherency value of the corresponding TAG value, then this may be fetched into the cache memory 8 as will be described further below. The access control circuitry is responsive to the coherency statuses it reads (these coherency statuses being managed by the coherency control circuitry 20 and the snoop controller 22) to manage the accesses to the capability value and the corresponding TAG value to be performed atomically by ensuring that the coherency statuses indicate that all of the atomic set of data accesses comprising the access to the coherency value and the access to the corresponding TAG value can be performed together within the cache memory before that atomic set of data accesses is commenced. If the coherency statuses are not such as to permit the accesses to be performed locally with the data values stored within the cache memory 8 of the processor core which originated the access requests, then snoop requests and snoop responses are exchanged using the coherency control circuitry 20 and the snoop controller 22 with the remainder of the data processing system 2 in order to obtain the copies of the cache lines concerned with an appropriate coherency status that does permit the accesses which form part of the atomic set of accesses to be performed locally within the cache memory 8.

In the case where the atomic set of data accesses is an atomic set of data writes, then the access control circuitry 30 serves to ensure that the coherency statuses for all of the atomic set of data writes are write-permitting coherency statuses that permit all of those atomic set of data writes to be performed within the cache memory 8 before any of the set of atomic data writes are commenced and perform together atomically with low latency. Examples of the write-permitting coherency statuses in the case of the example illustrated in FIG. 1 include an exclusive coherency status indicating that the cache memory 8 has an exclusive access write to the corresponding cache line, and a modified coherency status indicating that the cache memory 8 is storing a corresponding data item with a value that has been modified whilst it was stored within the cache memory 8.

When a write is made to a data item (cache line 18) within the cache memory 8, coherency statuses are used by the coherency control circuitry 20 and the snoop controller 22 to control subsequent modification of any corresponding data values held elsewhere within the data processing apparatus. It is possible that any corresponding subsequent data writes resulting from any of the atomic set of data writes may be deferred by the coherency control circuitry 20 until the cache memory 8 is no longer storing the data item concerned with a write-permitting data access, e.g. the coherency status of that data item is changed from exclusive or modified.

In the case where the atomic set of data accesses are an atomic set of data reads, the access control circuitry may serve to ensure that the coherency statuses for all of the atomic set of data reads are read-permitting coherency statuses that permit all of the atomic set of data reads to be performed within the cache memory 8 before any of that atomic set of data reads are commenced such that they can then be performed together atomically with low latency. Examples of read-permitting coherency statuses in the example embodiment of FIG. 1 include an exclusive status as discussed above, a modified status as discussed above, and a shared coherency status indicating that the cache memory 8 is storing an up-to-date copy of a corresponding data item that is also stored elsewhere within the data processing system 2 (e.g. outside of the particular cache memory 8 concerned).

Figure 2:
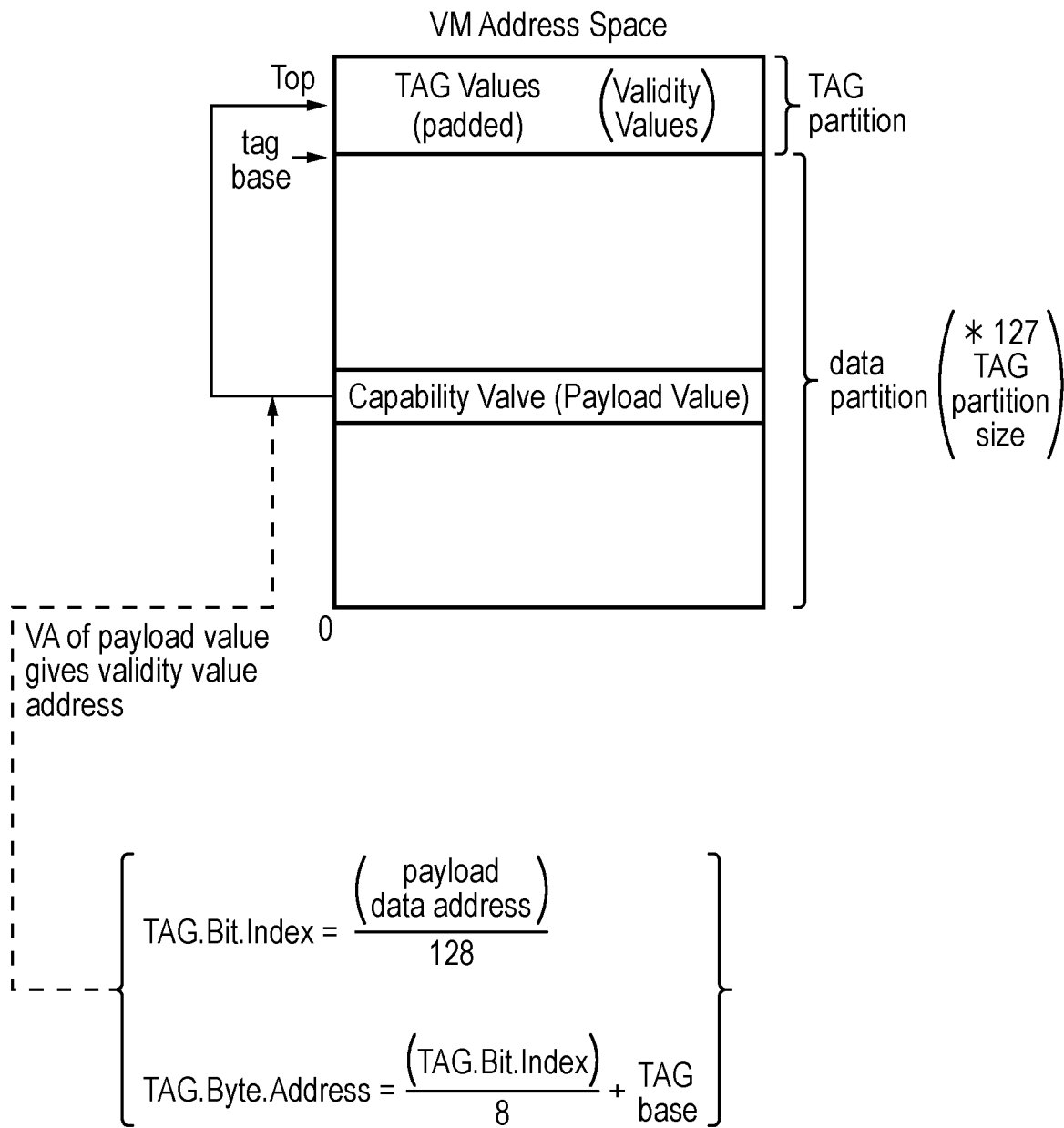
FIG. 2 is a diagram schematically illustrating how a TAG value (validity value) address may be derived from a capability value (payload value) address.

FIG. 2 schematically illustrates the relationship between an address of a payload value (e.g. capability value) and a corresponding validity value (e.g. TAG value). In the example illustrated, the virtual memory address space as used by the processor core 4 has its uppermost $128^{th}$ portion dedicated to storing the validity values. The uppermost portion starts at a TAG base address. Accordingly, the address of a validity value may be determined as shown in FIG. 2. Thus, the virtual memory address space is divided into a data partition for storing payload values and a corresponding TAG partition for storing validity values. The validity values stored within the TAG partition may be single bit values which are padded with intervening null values (or potentially other metadata). This is done such that when a cache line 18 of TAG values is loaded into one of the cache memories 8 within a multiprocessor system, the cache line concerned relates to fewer corresponding cache lines of payload data and accordingly there is less contention for a given cache line of TAG values.

Figure 3:
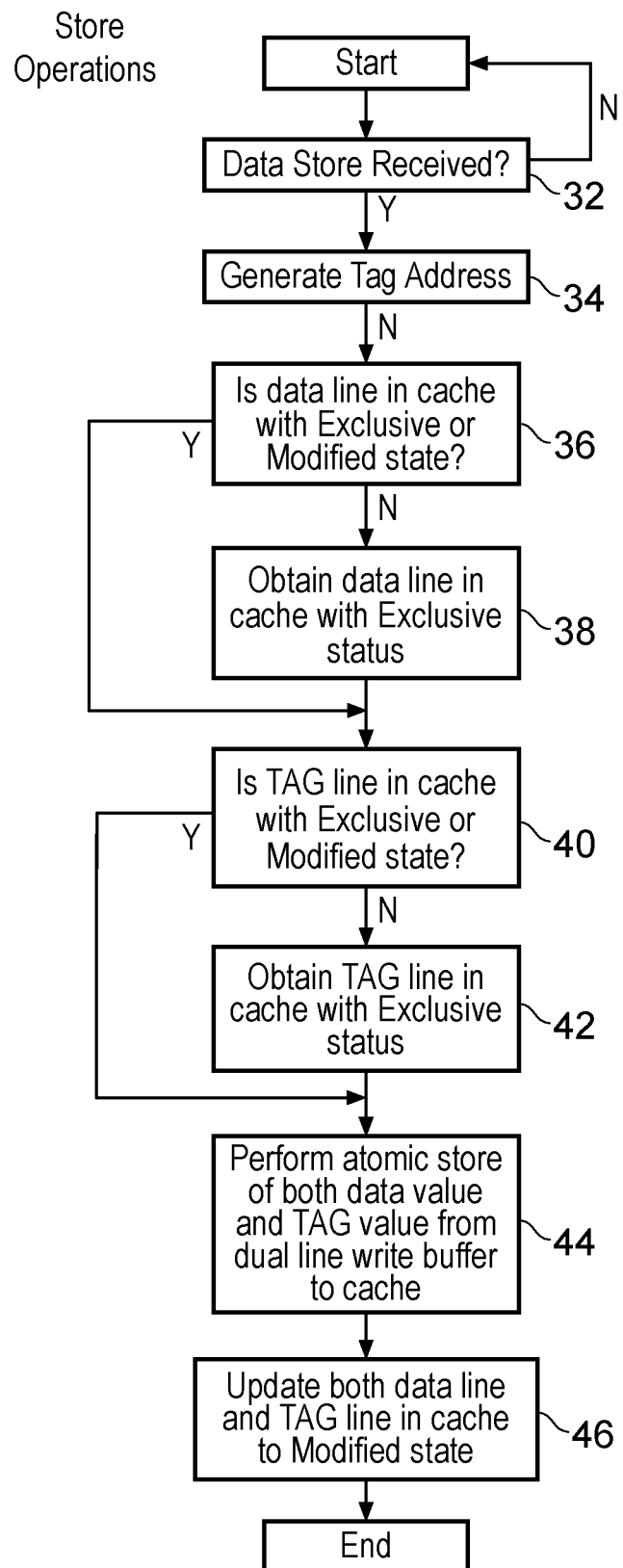
FIG. 3 is a flow diagram schematically illustrating store operations.

FIG. 3 is a flow diagram schematically illustrating store operations which may be performed in accordance with the present techniques. Processing waits at step 32 until a data store operation is received. Step 34 then generates a corresponding TAG address for the received data store operation in accordance with the relationship, shown in FIG. 2. Step 36 determines whether or not the data line for the data store received at step 32 is present within the cache memory 8 with an exclusive or modified state. If the determination at step 36 is that the data line is not present with an exclusive or modified state, then processing proceeds to step 30 at which the data line is obtained either from the main memory 16 or from another core and cache combination. If the determination at step 36 is that the data line is already present within the cache memory aimed with an exclusive or modified state, then step 38 is bypassed.

At step 40 a determination is made as to whether the TAG line containing the TAG value for the data line of the data store concerned is already present in an exclusive or modified state within the cache memory 8. If the TAG line is not present, then it is obtained with an exclusive status at step 42 from either the memory 16 or another core and cache combination. If the determination at step 40 is that the TAG line is already present with either an exclusive or modified state within the cache 8, then step 42 is bypassed.

The actions of steps 36, 38, 40 and 42 ensure that before arriving at step 44, both the data line and the corresponding TAG line are present within the cache memory 8 in either an exclusive or modified state. Step 44 then performs an atomic store of both the data value within the data line and the corresponding TAG value from the dual line write buffer within the buffer circuitry 6. Step 46 updates the coherency status of both the data line and the TAG line written at step 44 to indicate that these have been modified.

Figure 4:
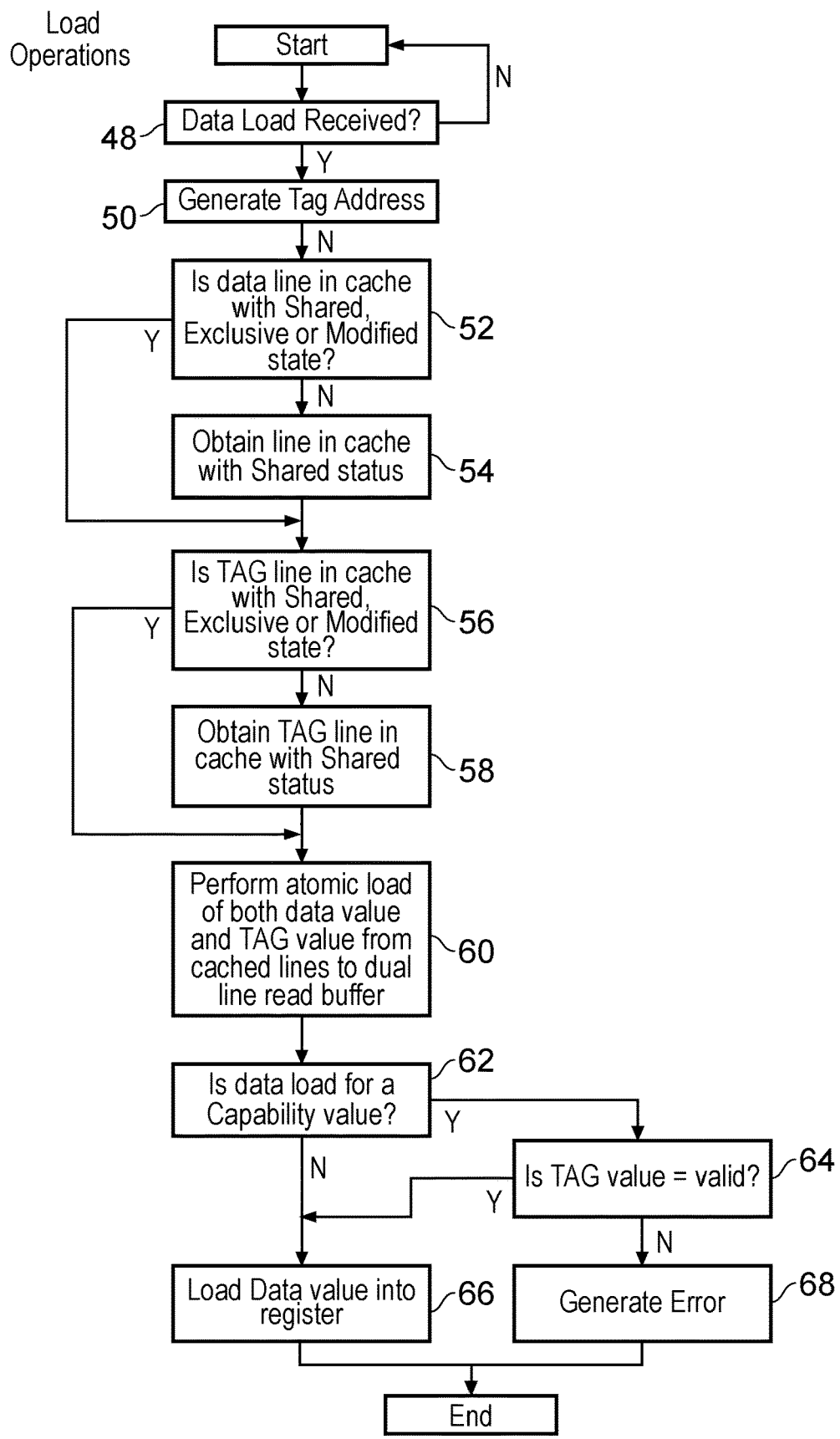
FIG. 4 is a flow diagram schematically illustrating load operations.

FIG. 4 is a flow diagram schematically illustrating load operations. Processing waits at step 48 until a data load is received. Step 50 then generates a TAG address corresponding to the received data load. Step 52 determines whether the data line corresponding to the data load received at step 48 is currently present within the cache memory 8 with one of a shared, exclusive or modified state. If the data line is not so present, then step 54 serves to obtain the data line in the cache memory 8 with a shared status. If the data line is already present within the cache memory 8, then step 54 is bypassed. Step 56 determines whether or not the TAG line corresponding to the data load received at step 48 is already present within the cache memory 8 with one of a shared, exclusive or modified state. If the TAG line is not already so present, then it is obtained at step 58 with a shared status. If the TAG line is determined by step 56 to already be present, then step 58 is bypassed.

Step 60 performs an atomic load of both the data value and the TAG value cached within the cache memory 8 into the dual line read buffer of the buffer circuitry 6. This atomic load using the dual line read buffer ensures that the data line and the TAG value remain consistent with each other.

Step 62 determines whether the data load received at step 48 corresponds to the load of a capability value. If the load is of a capability value, then step 64 determines whether the corresponding TAG value is valid indicating that the load is being properly made. If the TAG value is valid, then step 66 serves to load the data value into the appropriate register within the core 4. If the TAG value is determined at step 64 not to be valid, then step 68 serves to generate an error.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:
1. Apparatus for processing data comprising:
processing circuitry to perform data processing operations, said data processing operations including data access operations;
a cache memory to store data items to be accessed by said data access operations;

coherency control circuitry to control coherency between said data items stored within said cache memory and one or more other copies of said data items stored outside said cache memory;

a data access buffer to buffer a plurality of data accesses to respective data items stored within said cache memory; and access control circuitry, responsive to a signal from the processing circuitry indicating that a current data access operation being executed by the processing circuitry is one of a plurality of data access operations to be performed together atomically as an atomic set of data accesses, to:

determine, for respective data items to be accessed in response to executing said plurality of data access operations, corresponding coherency statuses managed by the coherency control circuitry; and determine, in response to the corresponding coherency statuses, whether the corresponding coherency statuses permit all of said atomic set of data accesses to be performed within said cache memory;

wherein, before said atomic set of data accesses are commenced and performed together atomically, in absence of said corresponding coherency statuses permitting all of said atomic set of data accesses to be performed within said cache memory, the coherency control circuitry is configured to request copies of said respective data items with updated coherency statuses that permit all of said atomic set of data accesses to be performed within said cache memory.

2. Apparatus as claimed in claim 1, wherein said data items are stored within respective cache lines of said cache memory and said coherency status is managed on a per-cache-line basis.

3. Apparatus as claimed in claim 1, wherein said atomic sets of data accesses is an atomic set of data writes, and said access control circuitry ensures said coherency statuses for all of said atomic set of data writes are write-permitting coherency statuses that permit all of said atomic sets of data writes to be performed within said cache memory before said atomic set of data writes are commenced and performed together atomically.

4. Apparatus as claimed in claim 3, wherein said write-permitting coherency statuses include:

an exclusive coherency status indicating said cache memory has an exclusive access right to a corresponding data item; and a modified coherency status indicating said cache memory is storing a corresponding data item with a value that has been modified within said cache memory.

5. Apparatus as claimed in claim 3, wherein said coherency control circuitry controls any consequential corresponding writes to other copies said data items stored outside said cache memory and corresponding to any of said set of atomic data writes.

6. Apparatus as claimed in claim 5, wherein a consequential corresponding write of a data item corresponding to one of said atomic set of data writes is deferred by said coherency control circuitry until said data item stored within said cache memory no longer has a write-permitting coherency status.

7. Apparatus as claimed in claim 1, wherein said atomic sets of data accesses are an atomic set of data reads, and said access control circuitry ensures said coherency statuses for all of said atomic set of data reads are read-permitting coherency statuses that permit all of said atomic sets of data reads to be performed within said cache memory before said atomic set of data reads are commenced and performed together atomically.

8. Apparatus as claimed in claim 7, wherein said read-permitting coherency statuses include:

an exclusive coherency status indicating said cache memory has an exclusive access right to a corresponding data item;

a modified coherency status indicating said cache memory is storing a corresponding data item with a value that has been modified within said cache memory; and a shared coherency status indicating said cache memory is storing an up-to-date copy of a corresponding data items that is also stored outside said cache memory.

9. Apparatus as claimed in claim 1, wherein said atomic set of data accesses are accesses to a payload value and a corresponding validity value indicative of validity of said payload value.

10. Apparatus as claimed in claim 9, wherein said access control circuitry is responsive to a data access operation to said payload value performed by said processing circuitry in response to a program instruction executed by said processing circuitry to generate a data access operation to said corresponding validity value.

11. Apparatus as claimed in claim 10, wherein said access control circuitry determines a memory address storing said corresponding validity data value from a memory address specified by said data access operation to said payload value.

12. Apparatus as claimed in claim 10, wherein when data access operation to said payload data is a payload read operation to read said payload value, said access control circuitry is responsive to said validity value indicating validity of said payload value to permit return of said payload value and is responsive to said validity value indicating invalidity of said payload value to prevent return of said payload value.

13. Apparatus as claimed in claim 10, wherein when data access operation to said payload data is a payload write operation to write said payload value, said access control circuitry atomically writes said payload value and said validity value to indicate validity of said payload value.

14. Apparatus as claimed in claim 10, wherein when data access operation to said payload data is a standard read operation to read said payload value, said access control circuitry is responsive to said validity value indicating validity of said payload value to prevent return of said payload value and is responsive to said validity value indicating invalidity of said payload value to permit return of said payload value.

15. Apparatus as claimed in claim 10, wherein when data access operation to said payload data is a standard write operation to write said payload value, said access control circuitry is responsive to said validity value indicating validity of said payload value atomically to perform a write of said payload data and a write of said validity value to indicate invalidity of said payload data and is responsive to said validity value indicating invalidity of said payload value to perform a write of said payload data.

16. Apparatus as claimed in claim 9, wherein said access control circuitry checks said validity value is stored within said cache memory with a coherency status indicating permitted access to said validity value within said cache memory prior to allowing any action to acquire said payload data stored within said cache memory with a coherency status indicating permitted access.

17. Apparatus as claimed in claim 9, wherein said payload data is capability data indicative of permitted processing capabilities of a corresponding of a process executed by said processing circuitry.

18. Apparatus as claimed in claim 9, wherein said data items are stored within respective cache lines of said cache memory and said coherency status is managed on a per-cache-line basis, and a plurality of said validity values stored within a cache line are padded within said cache line to reduce a number of validity values within said cache line and sharing a coherency status.

19. A method of processing data comprising the steps of:
performing data processing operations, said data processing operations including data access operations;
storing within a cache memory data items to be accessed by said data access operations;
controlling coherency between said data items stored within said cache memory and one or more other copies of said data items stored outside said cache memory;
buffering a plurality of data accesses to respective data items stored within said cache memory;
in response to a signal indicating that a current data access operation being executed is one of a plurality of data access operations to be performed together atomically as an atomic set of data accesses, determining, for respective data items to be accessed in response to executing said plurality of data access operations, corresponding coherency statuses;
determining, in response to the corresponding coherency statuses, whether the corresponding coherency statuses permit all of said atomic set of data accesses to be performed within said cache memory; and
before said atomic set of data accesses are commenced and performed together atomically, in absence of said corresponding coherency statuses permitting all of said atomic set of data accesses to be performed within said cache memory, requesting copies of said respective data items with updated coherency statuses that permit all of said atomic set of data accesses to be performed within said cache memory.

\* \* \* \* \*